United States Patent
Throop et al.

(10) Patent No.: US 9,606,790 B2
(45) Date of Patent: Mar. 28, 2017

(54) SMART VEHICLE REFLASH WITH BATTERY STATE OF CHARGE ESTIMATOR

(71) Applicant: FORD GLOBAL TECHNOLOGIES, LLC, Dearborn, MI (US)

(72) Inventors: Medville Jay Throop, Ann Arbor, MI (US); Brian D. Tillman, Dearborn, MI (US); Paul A. Mueller, St. Clair Shores, MI (US); April D. Johnson, Canton, MI (US); Charles H. Nagi, Palo Alto, CA (US)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 42 days.

(21) Appl. No.: 14/951,993

(22) Filed: Nov. 25, 2015

(65) Prior Publication Data

US 2016/0077827 A1    Mar. 17, 2016

Related U.S. Application Data

(62) Division of application No. 14/231,818, filed on Apr. 1, 2014, now Pat. No. 9,229,704.

(51) Int. Cl.
  *G06F 9/44*   (2006.01)
  *G06F 9/445*  (2006.01)
  *G06F 17/30*  (2006.01)

(52) U.S. Cl.
  CPC .......... *G06F 8/65* (2013.01); *G06F 17/30203* (2013.01); *G06F 17/30876* (2013.01)

(58) Field of Classification Search
  USPC ....................................................... 717/172
  See application file for complete search history.

(56) References Cited

U.S. PATENT DOCUMENTS

| | | | |
|---|---|---|---|
| 7,426,633 B2 | 9/2008 | Thompson et al. | |
| 7,694,293 B2 | 4/2010 | Rao | |
| 7,848,278 B2 | 12/2010 | Chen et al. | |
| 8,555,273 B1 | 10/2013 | Chia et al. | |
| 8,813,061 B2 * | 8/2014 | Hoffman | G06F 8/65 |
| | | | 717/168 |
| 9,152,408 B2 * | 10/2015 | Murata | H02J 7/041 |
| 9,229,704 B2 * | 1/2016 | Throop | G06F 8/65 |
| 2003/0139939 A1 | 7/2003 | Spool et al. | |

(Continued)

*Primary Examiner* — Marina Lee
(74) *Attorney, Agent, or Firm* — Frank MacKenzie; MacMillan, Sobanski & Todd, LLC

(57) ABSTRACT

Electronic modules in motor vehicles are reflashed without encountering errors due to insufficient electrical power becoming available during a reflashing. A server system stores a database of update files together with data corresponding to a respective current draw and a respective reflash time associated with the respective update files when applied in each respective vehicle. A vehicle sends pedigree information to the server system which then identifies relevant update files and corresponding current draw and reflash time data for the particular vehicle. The relevant update files and corresponding data are sent to the particular vehicle. A state of charge of a battery in the vehicle is determined. A depleted state of charge is estimated that would remain after applying a relevant update file. The update file is not applied if the estimated depleted state of charge is less than a predetermined state of charge.

2 Claims, 3 Drawing Sheets

(56) References Cited

U.S. PATENT DOCUMENTS

| | | |
|---|---|---|
| 2003/0167354 A1 | 9/2003 | Pepper et al. |
| 2004/0187011 A1 | 9/2004 | Lee et al. |
| 2004/0261073 A1 | 12/2004 | Herle et al. |
| 2005/0149481 A1 | 7/2005 | Hesselink et al. |
| 2005/0152318 A1 | 7/2005 | Elbatt et al. |
| 2005/0216902 A1 | 9/2005 | Schaefer |
| 2005/0256614 A1 | 11/2005 | Habermas |
| 2007/0168957 A1 | 7/2007 | Li et al. |
| 2007/0185624 A1 | 8/2007 | Duddles et al. |
| 2008/0005733 A1 | 1/2008 | Ramachandran et al. |
| 2008/0162036 A1 | 7/2008 | Breed |
| 2009/0260057 A1 | 10/2009 | Laberteaux et al. |
| 2011/0078675 A1 | 3/2011 | Van Camp et al. |
| 2011/0307882 A1* | 12/2011 | Shiba ................ G06F 8/65 717/173 |
| 2012/0144378 A1 | 6/2012 | Shah |
| 2013/0031540 A1 | 1/2013 | Throop et al. |
| 2013/0132939 A1* | 5/2013 | Murata ............... H02J 7/041 717/173 |
| 2013/0245884 A1 | 9/2013 | Forutanpour et al. |
| 2013/0326495 A1 | 12/2013 | Reunamaki et al. |
| 2014/0109075 A1* | 4/2014 | Hoffman .............. G06F 8/65 717/169 |
| 2014/0245284 A1 | 8/2014 | Alrabady et al. |
| 2014/0282467 A1 | 9/2014 | Mueller et al. |
| 2015/0128123 A1 | 5/2015 | Eling |
| 2016/0077827 A1* | 3/2016 | Throop ............... G06F 8/65 717/168 |

\* cited by examiner

US 9,606,790 B2

SMART VEHICLE REFLASH WITH BATTERY STATE OF CHARGE ESTIMATOR

CROSS REFERENCE TO RELATED APPLICATIONS

This is a divisional application of U.S. Ser. No. 14/231,818, filed Apr. 1, 2014, entitled "Smart Vehicle Reflash with Battery State of Charge (SOC) Estimator," which is incorporated herein by reference in its entirety.

STATEMENT REGARDING FEDERALLY SPONSORED RESEARCH

Not Applicable.

BACKGROUND OF THE INVENTION

The present invention relates in general to electronic systems and modules for motor vehicles, and, more specifically, to remotely reflashing or updating the software or firmware in the modules.

Modern vehicles have a significant number of software components and computerized hardware components that control vehicle subsystems. These components can react to changes in vehicle states to provide advanced capabilities for vehicle control. Additionally, many of these components can interact with each other, linking various modules of the vehicle over one or more data networks, such as, but not limited to, a vehicle CAN bus.

These modules typically include programmable processor/controller circuitry using customizable instruction sets in the form of software and/or firmware. One particular module design can be used with uniquely programmed versions in different vehicle models or in the same vehicle model with different option levels. All that is required is for the manufacturer to "flash" or program each individual module as necessary. In addition, a module may be capable of being dynamically updated after being sold and put into use. Thus, if an improvement or correction to a module's programming is needed, a change can be made to the module without requiring a hardware replacement. Thus, the manufacturer has the ability to rollout improvements to individual vehicles or across group of vehicles (e.g., models) in their vehicle fleet.

Typically, when a change to a module is desired, the vehicle has been brought to a diagnostic point (e.g., dealership) where a technician is present, or the technician with diagnostic and update tools has been dispatched to the vehicle. The technician accesses the desired software module(s), makes any needed changes, verifies that the change has been properly implemented, and then moves on to a next vehicle. When changes are to be made to large groups of vehicles in a fleet, the updating can take a long time and there is a risk that some vehicles may be missed.

In addition to having software control modules, many vehicles are equipped with one or more wireless transceivers capable of either direct communication with a remote network or via a portable wireless device (e.g., cellular phone) carried by the vehicle user. For example, a telematics module is often used to connect with a remote network and a telematics service provider for navigation, roadside assistance, remote vehicle access, and other services.

Using this wireless data communication capability, it becomes possible to reflash programmable memory of electronic modules remotely. For example, U.S. Application Publication 2013/0031540, filed on Jul. 26, 2011, which is incorporated herein by reference in its entirety, generally relates to a computer-implemented method that includes establishing a wireless connection with an update server. The method further includes sending at least a VIN number to the update server and downloading one or more module updates corresponding to the sent VIN number. After reflashing one or more modules to which the one or more updates correspond, the functionality of each module which has been flashed may be verified. Pending U.S. application Ser. No. 13/803,850, filed Mar. 14, 2013, which is incorporated herein by reference in its entirety, discloses methods and a system that allow for reflashing of multiple fleet vehicles with multiple modules on each fleet vehicle. Automatic documentation of entire flash events for a vehicle and immediate upload to the vehicle configuration database are provided. It discloses automatic detection of vehicle hardware configurations, communication of that configuration to a secure server, assembly of a software package and secure transmission to a vehicle, aiding in ensuring that each vehicle is flashed according to its specific configuration.

In order to reflash any particular module, the module cannot be in active operation. To ensure that a target module is not in use, the vehicle must be parked with the ignition off when conducting an update process. Since the engine is off and it cannot be assumed that the vehicle would be connected to a battery charger, electrical power consumed by the supervisory or master module (e.g., a telematics unit) and the module being updated must be supplied by a storage battery. During a reflash process, battery capacity as measured by its state of charge (SOC) will be depleted. If multiple modules are being reflashed (whether sequentially or in parallel), there is a risk that at some point the battery SOC may be reduced below a level that can support the ongoing reflashing. In that event, the reflash process may not complete, and one or more modules may be left in a nonfunctioning state. If the module is critical (e.g., a powertrain controller), the vehicle may be rendered inoperable, which would require a manual reflashing with a service tool after being towed to a service facility, for example. Even if the inoperable module is not essential for driving the vehicle, the battery may become so depleted that the vehicle cannot be started.

SUMMARY OF THE INVENTION

In one aspect of the invention, a method is provided for reflashing electronic modules without encountering errors due to insufficient electrical power becoming available during a reflashing. A server system maintains a database of update files for reflashing of respective electronic modules installed in respective vehicles within a vehicle fleet. The server system maintains data corresponding to a respective current draw and a respective reflash time associated with the respective update files when applied in each respective vehicle. Pedigree information is sent from a particular one of the respective vehicles to the server system. The server system identifies relevant update files and corresponding current draw and reflash time data for the particular vehicle in response to the pedigree information. The relevant update files and corresponding data are sent to the particular vehicle. A state of charge of a battery in the particular vehicle is determined. A depleted state of charge is estimated that would remain after applying a relevant update file. The update file is applied if the depleted state of charge is greater than a predetermined state of charge, and the update file is not applied if the depleted state of charge is less than the predetermined state of charge.

DETAILED DESCRIPTION OF PREFERRED EMBODIMENTS

Figure 1:
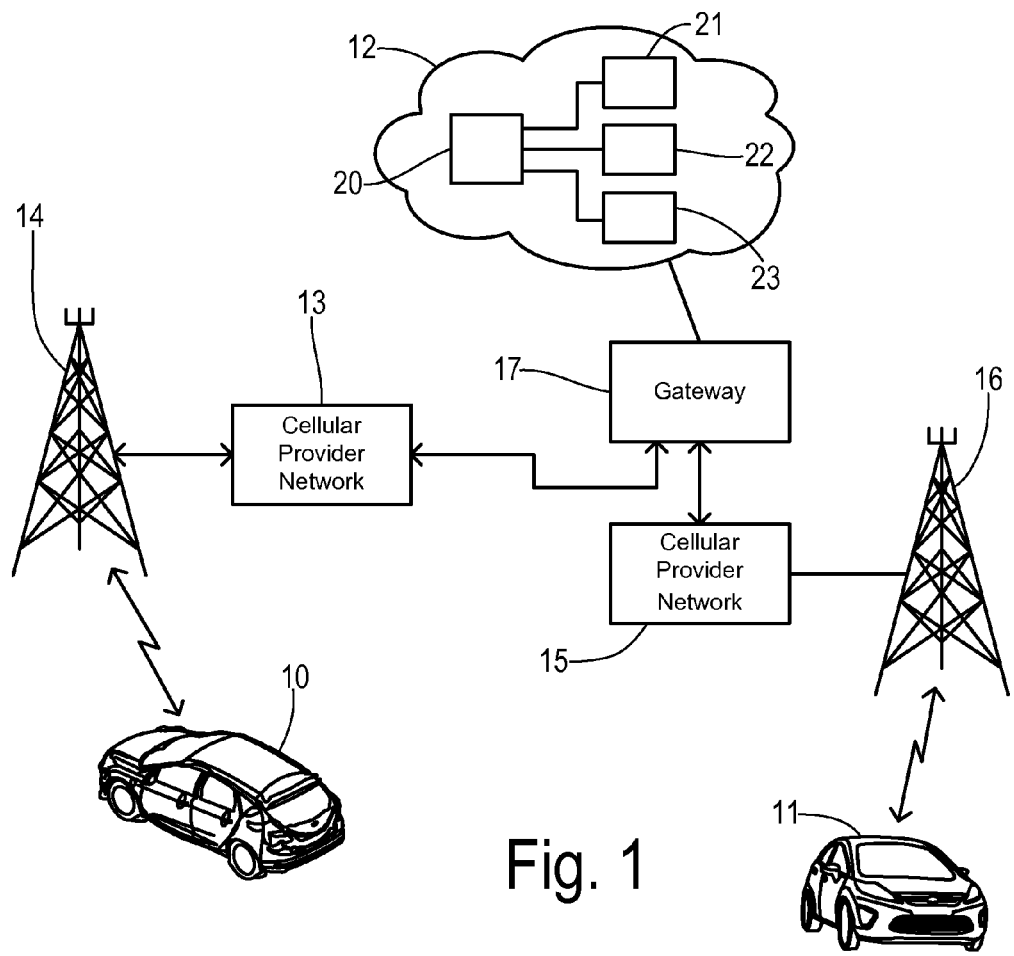
FIG. 1 is a block diagram showing mobile vehicles and an infrastructure for providing software/firmware updates to the vehicles for their updatable electronic modules.

The present invention provides a smart remote reflash process that operates as follows. Only those modules (i.e., the electronic control units or ECUs thereof) that need to be updated are reflashed, as determined by a pedigree scan of a vehicle's ECUs and a comparison of existing software levels with the latest software level from a remote server system. The server system maintains a database of current draw and estimated software reflash times for each ECU hardware level. The database may contain several corresponding reflash times for each particular ECU, depending on the specific software (e.g. strategy file, calibration file, configuration file, or the file may simply a be a patch— partial overwrite instead of a full replacement) and the environment or vehicle in which it appears. The reflash time estimate may include the time to erase prior to reflashing if appropriate for the ECU to be reflashed.

Based on a resulting list of ECUs to be reflashed, their respective reflash times, and total current draw of all the modules identified by the pedigree scan (including the telematics module supervising the process but less those that can be commanded to an off state if not being reflashed), an incremental battery SOC depletion is calculated for each ECU update which is estimated as the adjusted current draw multiplied by the time to reflash. A reflash schedule may be defined which tracks the estimated SOC remaining after each ECU is reflashed. The schedule should prioritize those ECUs that are critical to vehicle operation (such as the powertrain control module, PCM, and the transmission control module, TCM) to be reflashed first, when the battery SOC is highest. The list of ECUs in the schedule can be truncated if the estimated SOC remaining drops below a threshold value (e.g., 50% SOC) in order to avoid an ECU reflash failure or a failure to restart the vehicle. Some ECUs may not be reflashable when the SOC (or battery voltage) drops below some other value, and the worst case can be used to determine the threshold or a different threshold can be applied at different times during the overall process. If no individual module SOC constraint applies, then the lowest SOC that allows the vehicle to be started can be used as the threshold.

After each scheduled ECU reflash, the remaining SOC following the next ECU update can be re-estimated. Thus, a Kalman filter can be updated with a previous estimated SOC, a measured SOC, and a Kalman gain to provide an improved estimate of the remaining SOC following the next ECU reflash in the list. Alternatively, fuzzy logic or neural net algorithms may be used to estimate the post-reflash SOC. This improved battery SOC prediction can help minimize the risk of flash failure due to inaccurate SOC estimates.

When the opportunity is available, the onboard telematics unit can simultaneously reflash two or more ECUs over separate buses (e.g., a high speed CAN bus and a low speed CAN bus), thus conserving battery SOC by shortening the on-time for the telematics module.

The invention applies to ECUs in gasoline vehicles as well as hybrid and electric vehicles. The source of power for the telematics module and ECUs in conventional gasoline vehicles may be a lead acid battery. In electrified vehicles, the power might come from a lead acid battery or a hybrid battery such as Li-ion or nickel metal hydride. A value for the battery SOC is typically available over a vehicle multiplex bus from a module that monitors the battery. Otherwise, the SOC can be determined using a known method by calculating SOC based on parameters such as battery type, output voltage, and temperature.

When insufficient SOC remains to apply one or more EDU update files, then the corresponding update(s) are deferred. If the vehicle architecture and sensor set supports it, the vehicle could be remotely started if not located in an enclosed space so that the battery charging system can restore the SOC. Following restoration of the battery SOC to some acceptable value, the truncated reflashing schedule could then be completed.

Referring now to FIG. 1, vehicles 10 and 11 communicate wirelessly with a server system 12 via a data communication system (e.g., a mobile cellular communication system). Vehicle 10 communicates with a cellular provider network 13 via a cellular tower 14, and vehicle 11 communicates with a cellular provider network 15 via a cellular tower 16. Server system 12 is coupled to the cellular networks via a gateway 17. Cellular communication is a convenient means of data exchange in view of the availability of cellular-based telematics systems in cars. Of course, other wireless technologies can be used to remotely connect a vehicle with a server system, such as WIMAX or satellites.

Server system 12 may preferably include a main server 20 for interacting over the network with a main controller in the vehicle. Server 20 is coupled to and/or contains a vehicle database 21 which is maintained with vehicle identification numbers (VIN numbers) and corresponding hardware configurations (e.g., electronic modules) for the identified vehicles. An update database 22 coupled to server 20 contains update files for reflashing respective modules from a particular prior version to an updated version. Server 20 is further coupled to a database 23 containing data defining the respective current draw and respective reflash time associated with respective update files contained in database 22. Server system 12 may be maintained and operated by or on behalf of a vehicle manufacturer to appropriately interface with a particular fleet of vehicles, for example.

Figure 2:
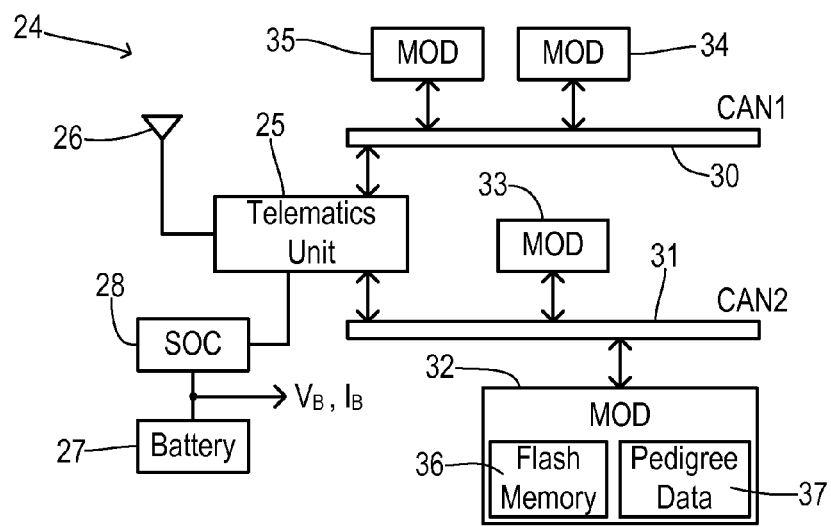
FIG. 2 is a block diagram of an electronic system in a vehicle.

FIG. 2 illustrates a vehicle system 24 including a telematics unit 25 having a cellular modem (not shown) connected to a cellular antenna 26. A vehicle battery 27 supplies an output current $I_B$ at voltage $V_B$ providing electrical power to various electrical components of the vehicle during a reflash operation as described below. A state of charge (SOC) determination circuit 28 coupled to battery 27 provides a measured SOC value to telematics unit 25.

The vehicle includes a pair of CAN buses 30 and 31 for providing multiplex communication between electronic modules within the vehicle. For example, CAN bus 30 may be a high-speed bus and CAN bus 31 may be a low-speed bus. A plurality of electronic modules 32-35 are coupled to buses 30 and 31, so that each can communicate with telematics unit 25. As shown for module 32, each of the modules includes a flash memory 36 and pedigree data 37 which identifies the version or service level of the updatable program contents currently stored in flash memory 36.

Telematics unit 25 is provided with programming and communication capabilities allowing it to obtain pedigree data from modules 32-35 and to supervise the application of new updates for reflashing the memories in modules 32-35. In particular, telematics unit 25 is preprogrammed with the capability to remotely access a server system in order to share pedigree data with the server system and receive from the server system respective update files to be applied to identified modules in the vehicle.

Figure 3:
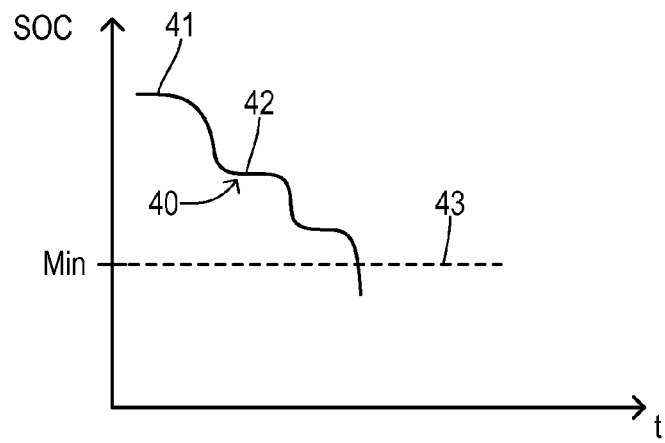
FIG. 3 is a plot showing depletion of a battery state of charge during a series of reflashing the memories in several electronic modules in a vehicle.

FIG. 3 illustrates the potential problem relating to insufficient battery SOC when reflashing certain modules while the vehicle ignition is off. A curve 40 represents depleting battery state of charge during a sequence of successive reflashing operations. At the beginning of the reflashing process, a relatively high SOC value is shown at 41. While a first module is being reflashed, battery state of charge depletes by a certain amount so that a diminished remaining SOC value is obtained at 42. During subsequent reflashing of additional modules, the SOC value may eventually fall to a minimum threshold 43. When this occurs, a partially reflashed memory may result in an in operative or erroneous state of the corresponding module. In order to avoid such an occurrence, one embodiment of the invention employs a method shown in FIGS. 4 and 5 to ensure that each application of an update to a module is conducted only if sufficient battery SOC is available to support completion of the reflashing.

Figure 4:
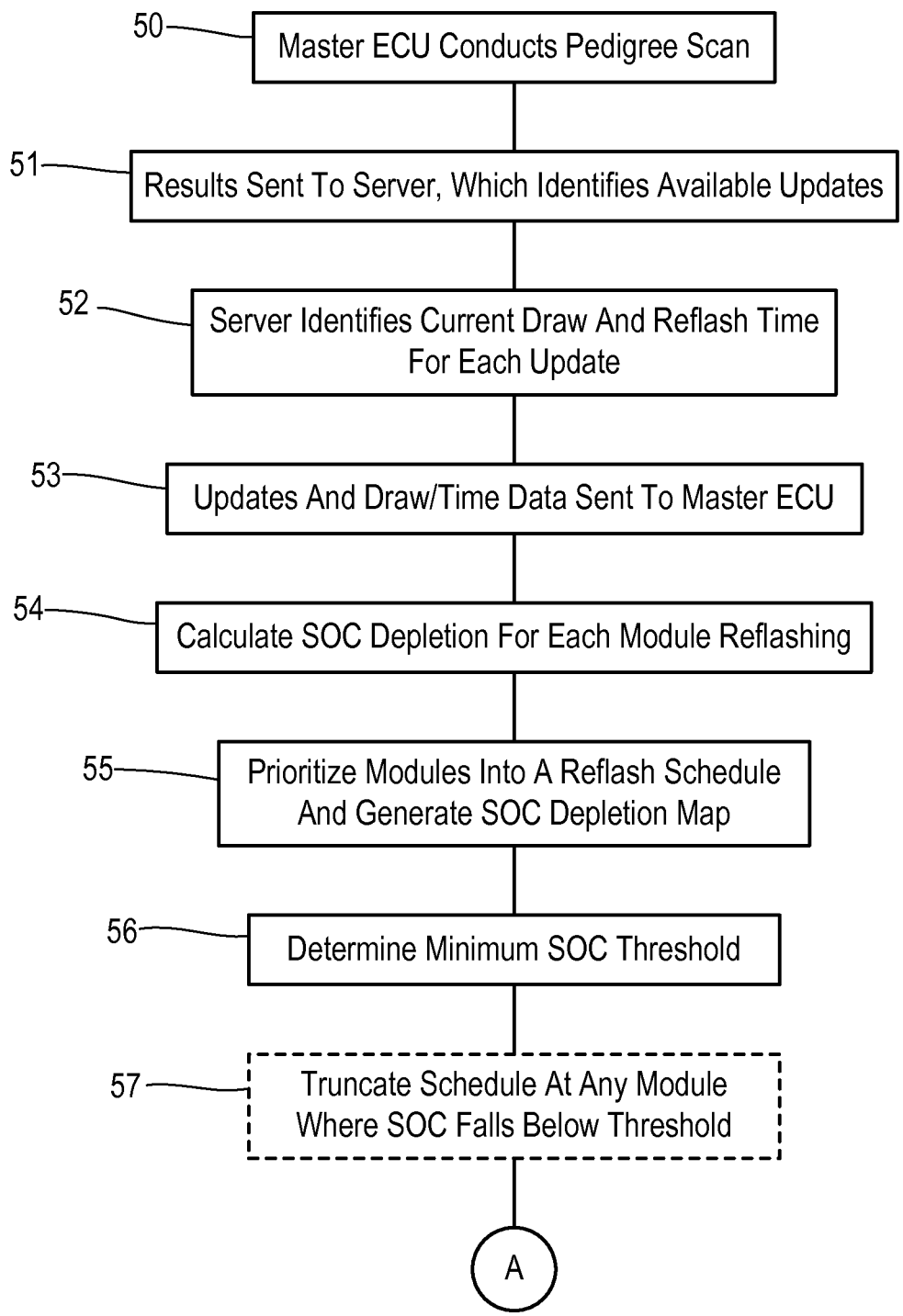

As shown in FIG. 4, a master ECU (e.g., the telematics unit) conducts a pedigree scan of all the updatable modules within the vehicle in step 50. The results of the pedigree scan may include a designation of a software or firmware version currently resident in each respective module together with information regarding hardware versions of the respective modules and/or a VIN number of the vehicle. The results of the pedigree scan are sent to a server system in step 51 so that the server system can identify available update files that would appropriately update each respective one of the electronic modules in the vehicle up to the current version. Due to module interdependencies, some modules may have to be updated as a pair. In step 52, the server system identifies a current draw (i.e., average current delivered by the battery to the telematics unit and the module being updated during reflashing) and expected reflash time corresponding to each update file. This data may be determined in advance by the manufacturer for reflashing from the known existing version to the known updated version using the known combination of hardware for all potential combinations in the fleet. It should be noted that the module being updated may be the telematics module itself, and that the current draw would be determined accordingly.

In step 53, the identified update files and data relating to the current draw and reflash time for each respective update file are sent to the master ECU. When the master ECU receives the updates and corresponding data, it can calculate a resulting SOC depletion in step 54 that would be expected to occur for each module that is being reflashed (unless this calculation is already done by the server system or configured into the database). The calculation may preferably be done at the vehicle so that the current draw estimate can include consumption by any additional modules operating within the vehicle while the updates are being applied. In step 55, the identified module updates are prioritized into a reflash schedule. Based on a current measurement of the battery SOC, the calculated SOC depletions, and the schedule, an SOC depletion map may be generated that reflects the successive changes in battery SOC to be expected as the successive module reflash events occur. As previously mentioned, prioritization may give precedence to critical modules such as a powertrain controller, or to modules that must be updated as a pair, but may also adopt an ordering of modules to be reflashed that maximizes the number of modules that can be reflashed before reaching the minimum SOC threshold.

In step 57, the schedule may be truncated at any module where the remaining battery SOC after a reflashing would fall below the threshold. As previously described, the threshold may correspond to a predetermined SOC value such as about 50%. Alternatively, a predetermined value may correspond with a known minimum value that supports the reflashing operation based on the hardware configuration of the vehicle. The minimum is preferably set no lower than at an SOC value that would be the minimum required in order to start the vehicle engine, if present.

Figure 5:
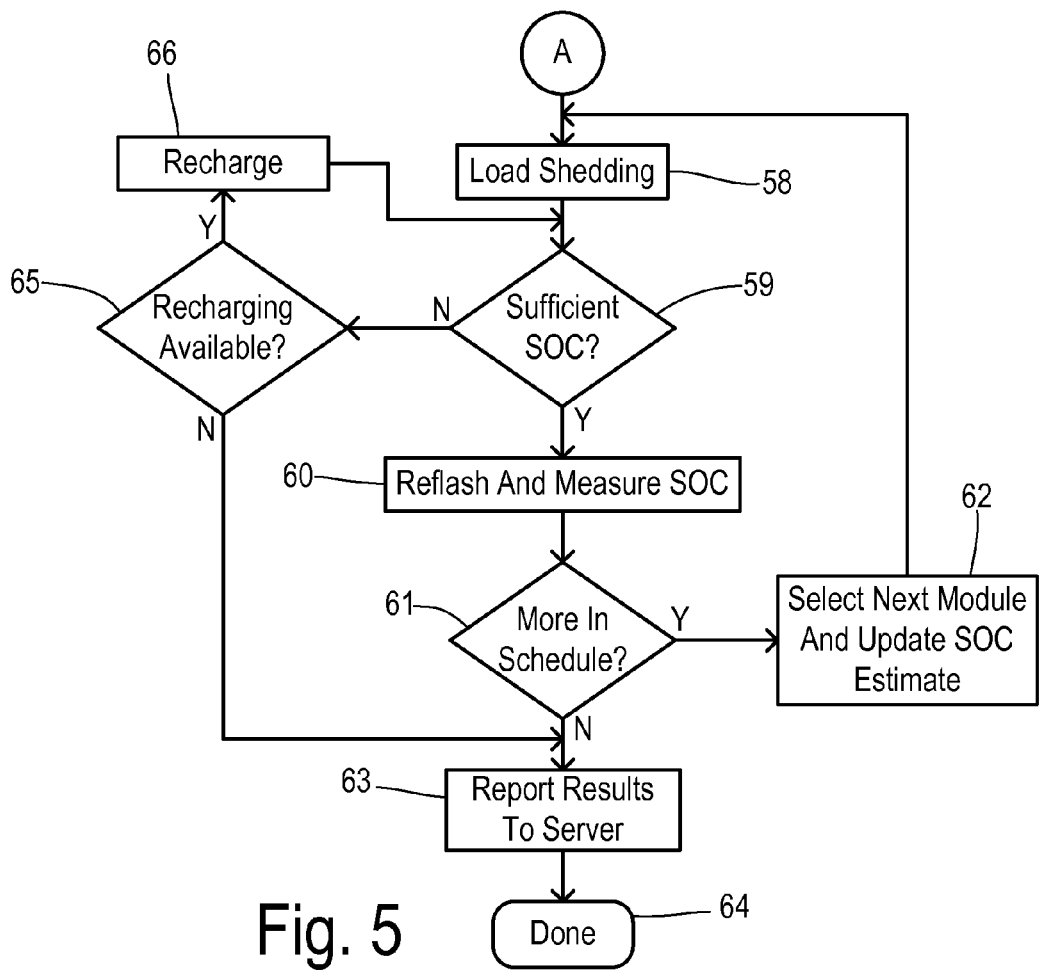
FIGS. 4 and 5 are a flowchart showing one preferred method of the present invention.

The method proceeds between the flowcharts of FIGS. 4 and 5 via point A. To begin application of an update file to a respective module identified in the reflashing schedule, a load shedding may first be performed in step 58. Load shedding involves an examination by the master ECU of the electronic modules currently using electrical power and the deactivation of any loads which are not needed during the reflashing of the current module. In step 59, a check is made to determine whether the currently measured SOC value of the battery is sufficient to support the reflashing of the current update file into the respective module while leaving a remaining SOC value after the application process which is expected to be greater than the minimum value. If the SOC value is sufficient, then the module is reflashed in step 60. Preferably, a battery SOC measurement is obtained at that time for the purposes of reporting results to the server system and to verify accuracy of the SOC predictions.

A check is performed in step 61 to determine whether there are any more electronic modules to be reflashed in the schedule. If so, then the next module is selected in step 62. Based on the newly measured SOC value, the estimated SOC value is updated in the depletion map corresponding to the time after application of an update to the selected module. The revised SOC estimate corresponding to the additional depletion resulting from the next module update can be obtained using a Kalman filter, for example. The improved estimate is then used in step 59 when checking whether sufficient battery SOC remains in order to sustain the additional depletion without then falling below the minimum SOC threshold.

When step 61 determines that there are no more updates in the schedule, then the master ECU reports the results of the reflashing process to the server system in step 63. Reporting may include the actual current draw and actual reflashing time, which can be used by the server system to improve the values stored in its database. After reporting the results, the process ends at step 64.

In the event that step 59 determines that there is insufficient battery SOC to perform a desired update, then the update is not applied. Optionally, a check may be performed in step 65 to determine whether the vehicle is capable of automatically recharging the battery. For example, recharging may be available in the event that the vehicle is equipped with a remote start system that can be automatically engaged by the master ECU (which may also depend on being parked in open air). If recharging is not available, then the results will be reported to the server system in step 63 and the method ends in step 64. If recharging is available, then a recharge may be performed in step 66 (e.g., by starting the vehicle engine and running the charging system until a SOC value above a desired value is obtained), and then the engine may be turned off. Then a return may be made to step 59 for a second attempt at reflashing the scheduled module.

What is claimed is:

1. A server system for updating electronic modules installed in respective vehicle models in a vehicle fleet, comprising:
    a database of update files maintained in the server system for reflashing of respective electronic modules;
    a depletion database maintained in the server system storing data defining a respective current draw by the electronic modules involved in each respective reflashing and defining a respective reflash time associated with each respective update file when applied in each respective vehicle model;
    a telematics unit within each vehicle model communicating data wirelessly to and from each vehicle model;
    a controller in the server system coupled to the databases and configured to A) receive pedigree information from a particular one of the respective vehicles to the server system via the telematics unit, B) identify relevant update files and corresponding current draw and reflash time data for outdated modules in the particular vehicle in response to the pedigree information, C) send the relevant update files and corresponding data to the particular vehicle model, D) receive a report of an actual reflash time from the particular vehicle model after applying a respective update file via the telematics unit, E) receive a report of an actual current draw from the particular vehicle model via the telematics unit after applying the respective update file, and F) updating the current draw and reflash time data maintained on the server system in response to the reported actual reflash time and actual current draw.

2. The server system of claim 1 wherein the data stored in the depletion database is determined in advance in response to reflashing from each known existing version to the updated version for each potential combination of electronic modules for each potential vehicle model in the vehicle fleet.

* * * * *